Figure 1:
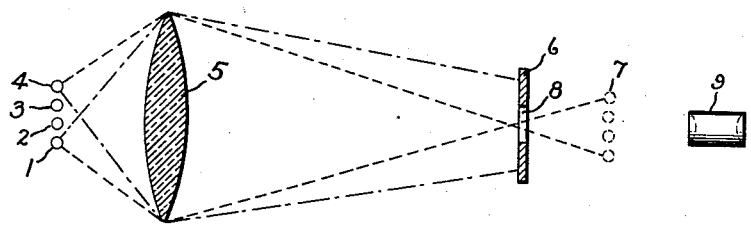

J. A. ORANGE.
CONDENSER FOR PROJECTION APPARATUS.
APPLICATION FILED OCT. 24, 1917.

1,269,496. Patented June 11, 1918.

Inventor:
John A. Orange,
by
His Attorney

UNITED STATES PATENT OFFICE.

JOHN A. ORANGE, OF SCHENECTADY, NEW YORK, ASSIGNOR TO GENERAL ELECTRIC COMPANY, A CORPORATION OF NEW YORK.

CONDENSER FOR PROJECTION APPARATUS.

1,269,496.  Specification of Letters Patent.  Patented June 11, 1918.

Application filed October 24, 1917. Serial No. 198,331.

*To all whom it may concern:*

Be it known that I, JOHN A. ORANGE, a subject of the King of Great Britain, residing at Schenectady, in the county of Schenectady, State of New York, have invented certain new and useful Improvements in Condensers for Projection Apparatus, of which the following is a specification.

My present invention relates to condensers for projection apparatus in which an incandescent lamp is used as a light source.

The object of my invention is to provide an improvement in the arrangement of condensing lenses used in such apparatus whereby the light from the source may be utilized to better advantage than with the apparatus which has previously been employed.

When an arc is used as a source of light for moving picture projection it is customary to focus an image of the illuminant, that is of the positive crater, on to the film gate opening. When, however, a light source having marked structure, such for example as an incandescent filament made in the form of a grid, is used in place of the arc it is necessary to focus the image of the illuminant to a point beyond the film gate opening in order to secure a uniform illumination of the screen. When this is done it is apparent that a considerable amount of light from the source does not pass through the opening and is therefore wasted.

If, for example, the lamp used has a filament made up of a group of vertical, helically wound coils, and the image is focused upon the film gate opening, the screen illumination will exhibit vertical streakiness while the streakiness in a horizontal direction will be comparatively insignificant. Hence it is to avoid this vertical streakiness that it becomes necessary to focus the image of the illuminant to a point beyond the opening.

The condensers which have heretofore been employed with such apparatus have been constructed with axial symmetry so that in overcoming the tendency to vertical streakiness upon the screen, light is wasted on all sides of the opening and the source employed must have larger dimensions in both directions than would be required if the image could be focused onto the film gate opening. In other words, while it is impossible to prevent wasting some light in order to secure uniform illumination, light is wasted unnecessarily above and below the opening in order to overcome the effect of streakiness in one direction only.

In order to overcome this disadvantage I construct the condenser with a certain amount of astigmatism, that is in such a way that in the vertical section it has a shorter focal length than in the horizontal section. By this arrangement the image of the light source in a vertical direction will be focused upon the film gate opening and in the horizontal direction it will be focused to a point beyond the opening. Thus no light will be wasted above and below the opening and the only light which is wasted will be that which falls on each side of the opening. This waste is of course unavoidable with the type of light source described.

Figure 2:
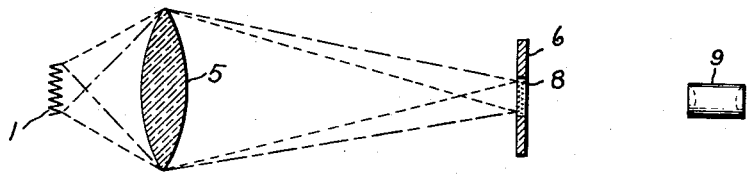
Figure 3:
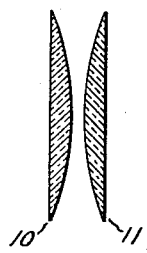
Figure 4:
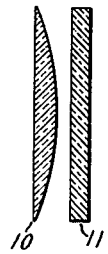

The novel features which I believe to be characteristic of my invention are pointed out with particularity in the appended claims. The invention itself, however, will best be understood by reference to the following description taken in connection with the accompanying drawing in which Figure 1 is a diagrammatic representation of an axial section through the apparatus, taken in a horizontal plane; Fig. 2 is a similar view taken in a vertical plane; and Figs. 3 and 4 are similar sections of a modified form of condenser.

As indicated in the drawing the light source is made up of four vertically arranged helical coils 1, 2, 3, and 4, which form the filament of an incandescent lamp. The condenser lens 5 has such a radius of curvature in a horizontal direction and is so located with respect to the light source and the aperture plate 6 that the image of the light source in a horizontal direction is focused to a point 7 between the film gate opening 8 and the objective 9 although in some cases it may be found desirable that the image may be focused to a point upon the objective. The radius of curvature of the lens 5 in a vertical direction is greater than in a horizontal direction so that the image of the light source in the vertical direction is focused upon the film gate opening 8. This condition will be fulfilled by making the condenser of an elliptical form instead of the customary circular form. It will of course be apparent, however, that the necessary condition may be fulfilled by the use of various other forms of condensing lenses. For example, as indicated in Figs. 3 and 4 the condenser may be made up of the usual spherical lens 10 and a second lens 11 which is of cylindrical form, the axis of the cylinder being horizontal so that in the horizontal section, as shown in Fig. 3, the image of the light source may be focused to a point beyond the film gate opening while in the vertical section, as shown in Fig. 4, the image of the light source may be focused to the film gate opening.

What I claim as new and desire to secure by Letters Patent of the United States, is:—

1. The combination in a projection apparatus of a light source of such structure that when used with a symmetrical condenser in such a way as to utilize the light to best advantage it produces a non-uniform illumination on a screen and an astigmatic condenser associated therewith in such a way as to produce a substantially uniform illumination on a screen.

2. The combination in a projection apparatus of a light source made up of a plurality of parallel spaced portions, a plate having an aperture therein and an astigmatic condenser associated therewith in such a way that the image of said source in a direction parallel to said spaced portions is focused to the aperture in said plate, and the image of said source in a direction perpendicular to said spaced portions is focused to a point beyond said plate.

3. The combination in a projection apparatus of a light source made up of a plurality of parallel spaced portions and an astigmatic condenser associated therewith in such a way as to produce from said source a substantially uniform illumination upon a screen.

In witness whereof, I have hereunto set my hand this 23rd day of October, 1917.

JOHN A. ORANGE.